US012560902B2

(12) United States Patent
Kauffmann et al.

(10) Patent No.: US 12,560,902 B2
(45) Date of Patent: Feb. 24, 2026

(54) METHOD FOR CONFIGURING A COATING PROCESS

(71) Applicant: SAINT-GOBAIN GLASS FRANCE, Courbevoie (FR)

(72) Inventors: Thierry Kauffmann, Pantin (FR); Dragutin Brezak, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 443 days.

(21) Appl. No.: 18/006,326

(22) PCT Filed: Jul. 13, 2021

(86) PCT No.: PCT/EP2021/069503
§ 371 (c)(1),
(2) Date: Jan. 20, 2023

(87) PCT Pub. No.: WO2022/023029
PCT Pub. Date: Feb. 3, 2022

(65) Prior Publication Data
US 2023/0288895 A1 Sep. 14, 2023

(30) Foreign Application Priority Data

Jul. 21, 2020 (EP) ..................................... 20315353

(51) Int. Cl.
*G05B 19/042* (2006.01)
(52) U.S. Cl.
CPC ..................... *G05B 19/0426* (2013.01); *G05B 2219/23322* (2013.01)
(58) Field of Classification Search
CPC ...... G05B 19/0426; G05B 2219/23322; G05B 2219/31001; G05B 2219/31472;
(Continued)

(56) References Cited

U.S. PATENT DOCUMENTS

2002/0193902 A1 12/2002 Shanmugasundram et al.
2007/0073430 A1 3/2007 Govind et al.
(Continued)

FOREIGN PATENT DOCUMENTS

DE 10 2018 101173 A1 7/2019
WO WO 2018/215274 A1 11/2018
WO WO 2019/110948 A1 6/2019

OTHER PUBLICATIONS

International Search Report as issued in International Patent Application No. PCT/EP2021/069503, dated Oct. 13, 2021.

*Primary Examiner* — Charles R Kasenge
(74) *Attorney, Agent, or Firm* — Pillsbury Winthrop Shaw Pittman LLP

(57) ABSTRACT

A computer implemented method for configuring a coating process to deposit a targeted mono- or multi-layered coating on a substrate, the method providing as output a series of ordered tasks executed on the coating process, and includes (a) providing a dataset including a data related to parameters of the coating process; (b) providing a set of algorithms which takes, as input, data from the dataset of (a) and provides, as output, series of at least one tasks associated to each algorithm; selecting two algorithms from the set of algorithms depending on current states of the coating process as provided as input data, and (d) selecting an order in which the algorithms selected at (c) has to be carried out so that the tasks provided by the algorithms are organized as a series of ordered tasks which are executed contextually onto the coating process at corresponding stages in the coating process.

16 Claims, 7 Drawing Sheets

(58) Field of Classification Search
CPC ........... G05B 2219/32266; G05B 2219/32291;
G05B 19/418; G05B 19/41865; G05B
13/02; G06Q 50/04; G06Q 10/06; Y02P
90/02; Y02P 90/30; Y02P 90/80
See application file for complete search history.

(56)                    References Cited

U.S. PATENT DOCUMENTS

| | | | |
|---|---|---|---|
| 2009/0222123 A1 | 9/2009 | Nevills et al. | |
| 2010/0327187 A1 | 12/2010 | Beloussov et al. | |
| 2016/0085944 A1* | 3/2016 | Brophy | G01W 1/00 |
| | | | 702/22 |
| 2019/0233936 A1* | 8/2019 | Fiukowski | H01J 37/32027 |
| 2019/0309409 A1 | 10/2019 | Nghiem et al. | |

\* cited by examiner

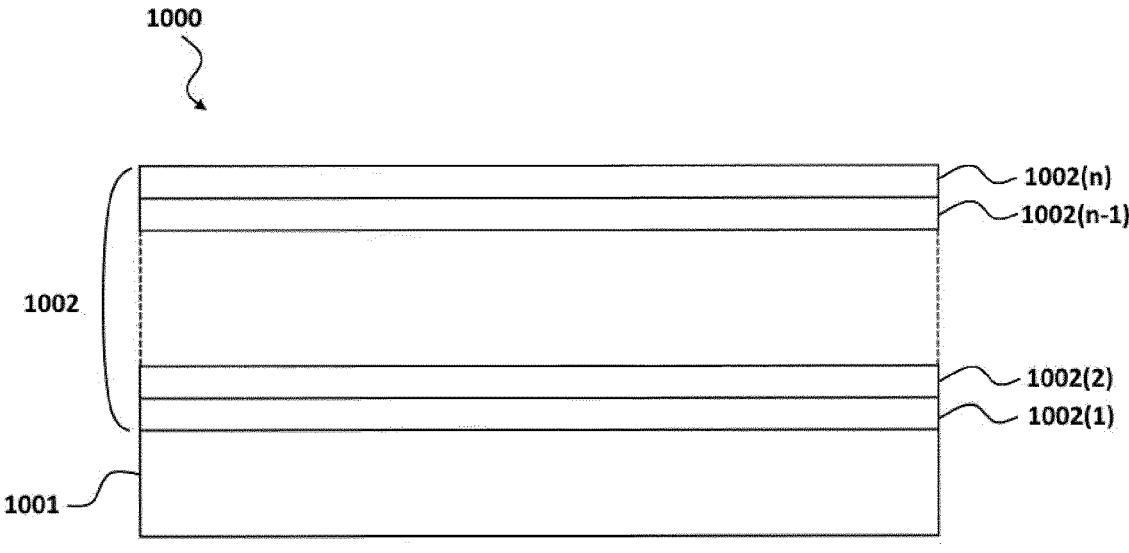
Fig. 1
[Fig. 2]
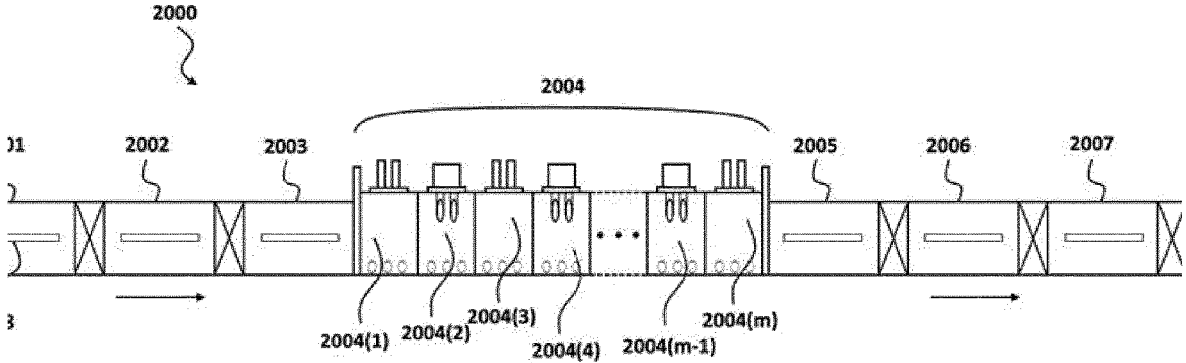

METHOD FOR CONFIGURING A COATING PROCESS

CROSS-REFERENCE TO RELATED APPLICATIONS

This application is the U.S. National Stage of PCT/EP2021/069503, filed Jul. 13, 2021, which in turn claims priority to European patent application number 20315353.1, filed Jul. 21, 2020. The content of these applications are incorporated herein by reference in their entireties.

TECHNICAL FIELD

The invention pertains to computer implemented methods for configuring a coating process to deposit a targeted mono- or multi-layered coating on a transparent substrate.

BACKGROUND ART

With reference to FIG. 1, mono- or multi-layered coatings 1002 are used to functionalize surfaces of a wide variety of substrates, particularly transparent substrates 1001 such as mineral or organic glasses. They bring optical properties and/or functionalities that suit specific applications.

For example, in the building industry, surfaces of transparent glass sheets are often coated with multi-layered low-emissivity or solar control coatings. These coatings are generally stacks of a plurality of chemically and physically, e.g. amorphous, crystallized or partially crystallized, different thin layers interacting with each other in order to alter the incident solar radiation falling on the surfaces of the glass panes.

These coatings often contain infrared-reflective metallic layers, mainly made of metals such as silver, gold, niobium or copper, to reduce heat and/or radiation transfer through the panes. They are often combined with dielectric layers, mainly through sandwiching configurations, to counterbalance or adjust colour shifts, reflection and/or transmission effects that are due to said metallic layers, and to provide the sought solar factor or heat emission rate, also called emissivity. Other layers, either metallic of dielectric, can also be incorporated in the coating to improve thermal and/or structural stability over time, during use, or upon subsequent transformations such as heating, tempering and/or bending.

Coating processes to deposit mono- or multi-layered coating on substrates are well-known in the art. In particular, in glass industry, stacks of thin films are generally coated on transparent mineral glass substrates by successive deposits of thin films by conveying glass substrates through a succession of deposit cells, each adapted to deposit a given thin film. The deposit cells can implement different deposit methods such as magnetic field assisted sputtering (also called magnetron sputtering), ion beam assisted deposition (IBAD), evaporation, chemical vapour deposition (CVD), plasma-enhanced chemical vapour deposition (PECVD), low pressure chemical vapour deposition (LPCVD).

With reference to FIG. 2, a common deposit process may be illustrated by a deposit system 2000 which comprises juxtaposed cells 2001-2007 through which a transparent substrate 2008 is successively conveyed. a deposit section 2004 comprising a succession 2004 of deposit cells 2004(1)-2004($m$).

Each deposit cell 2004(1)-2004($m$) may be featured with means for depositing coating, e.g. magnetic field assisted sputtering (also called magnetron sputtering) system, ion beam assisted deposition (IBAD) system, evaporation system, chemical vapour deposition (CVD) system, plasma-enhanced chemical vapour deposition (PECVD) system or low pressure chemical vapour deposition (LPCVD) system. The deposit cells 2004(1)-2004($m$) and other cells as well, may also comprise, among other components, pumping systems to create vacuum conditions that suit deposition, gas supplier to inject gases required for deposition, mechanical shields that regulate gas fluxes through air vents or blowholes, and electrical power suppliers to operate the mechanical actionable components or electric/electronic devices of the coating process.

Before to manufacture a new product, i.e. a new coated substrate, each cell of the coating process has to be accurately configured so the required specifications, e.g. thickness or chemistry of the layers in the coating for that product can be obtained.

Examples of operations that may need to be carried out for that configuration are: connecting/disconnecting cells that are required or not for the product to be manufactured, configuring pumping systems to adjust vacuum in coating process, setting electric power supplies and related software, setting conveyor speeds, adding gas and/or setting gas flows to adjust pressures in cells, and/or determining the working points of cathodes in case of deposition by sputtering.

These operations are not straightforward as multiple, often interdependent, parameters have to be adjusted simultaneously and/or consecutively. It can be very time-consuming as they can require a lot of trials, in particular for complex products, before the best combination of values for these parameters can be found. Furthermore, even if an appropriate combination seems to work during the setup time, i.e. time when the coating process is considered as ready to manufacture a first series of targeted products, this combination might not turn out to be as effective as expected during consecutive steps of product adjustment, i.e. trial time before the coating reaches its full production capacity.

Lastly, during the production, the coating process still needs to be maintained and its parameters to be continuously adjusted to prevent drift in the specifications. For example, the surrounding and/or inside environment of the coating process may change and induce changes in the chemistry of the layers being coated. In particular, for magnetic field assisted sputtering, temperature and/or humidity variation in the local atmosphere of the deposit cells may alter the surface chemistry of the cathodes and induce their detrimental erosion/corrosion/surface pollution which in turn may alter the deposition rate and the chemistry of the layers.

It is a common practice to manually, or semi-automatically, configure or set up, a coating process to obtain special features for the product to be manufactured. This requires skilled operators with a deep knowledge and understanding of the functioning and the particularities of the coating process. These operators may be eventually assisted by various software or electronic controllers. To configure a coating process, they often start from a previous configuration corresponding more or less to the same, or similar, product than that to be manufactured. As experienced as the operators may be, human errors cannot totally be prevented during the configuration so that production delays may occur.

Furthermore, even if the operators are able to manage the coating process during the setup time, the configuration they found might turn out to be ineffective during consecutive steps of product adjustment. Further production delay may occur as operators may need to intervene in the coating process. Worse, because of this intervention, the process can be out of order, even disrupted, by human wrong behaviours and errors.

It is known in the prior art, for example in WO 2019110948 A1, WO 2018215274 A1, DE 102018101173 A1 or WO 2019/110948 A1, to use feedback methods that implement one or several feedback loops which real-time control and/or adjust the parameters of a deposit system or deposit cells in function of shifts in values of selected optical and/or physicochemical properties of the deposited coating. These methods are efficient during the production time to adjust, for instance, the optical specifications of the product, i.e. after the setup and product adjustment stages, once the coating process is accurately configured for full production. Thus, they cannot be used as general tools to configure a coating process, before and during the production stage.

SUMMARY OF THE INVENTION

Technical Problem

Today, configuring a coating process in a technical and economic efficient way is mandatory to save human and material resources, and to reduce costs and energy consumption occurring from ineffective operations. There is a need for a general method to for rapidly and accurately configuring a coating process to deposit a targeted mono- or multi-layered coating on a transparent substrate, with minimum workload for operators and with no human error.

Solution to Problem

In a first aspect of the invention, there is provided a computer implemented method for configuring a coating process as described in claim 1, dependent claims being advantageous embodiments.

In a second aspect of the invention, there is provided a data processing system comprising means for carrying out a computer implemented method according to the first aspect of the invention.

In a third aspect of the invention, there is provided a method of entering and displaying of data in a data processing system comprising means for carrying out a computer implemented method according to the first aspect of the invention.

In a fourth aspect of the invention, there is provided a computer program and a computer readable medium comprising instructions which, when executed by a computer, cause the computer to carry out a computer implemented method according to the first aspect of the invention.

Advantages of the Invention

A first advantage of the invention is to provide chained and/or paralleled tasks in an optimized and contextualized order or sequence to set up the different components of said coating process in the most efficient way. The order or sequence may be defined according to time and/or to the substrate being currently coated at the different stage of the coating process.

Another outstanding advantage of the invention is to provide better interactions between the coating process and operator regarding the internal functioning of said coating process in order to rapidly and accurately configure the coating process to deposit a coating on transparent substrates. In particular, the method may help the operator to execute manually and/or automatically tasks at appropriate time in an optimized sequence so that the intervention of the operators is reduced, and the risk of process disruption and unwanted lag-times is limited.

In a sense, the method may help to alleviate the workload of human operators and improves the efficiency of the workflows by substrate and/or time contextualising the tasks to perform at different stages of the coating process. Direct benefices are: more process parameters may be adjusted in same time regarding more glass substrates to be coated, and the operators may be allowed to focus on tasks which require more attention.

BRIEF DESCRIPTION OF THE DRAWINGS

FIG. 1 is a schematic representation of layered coating on a substrate.

FIG. 2 is a schematic representation of a coating process to deposit mono- or multi-layered coating on a substrate.

DESCRIPTION OF EMBODIMENTS

Figure 3:
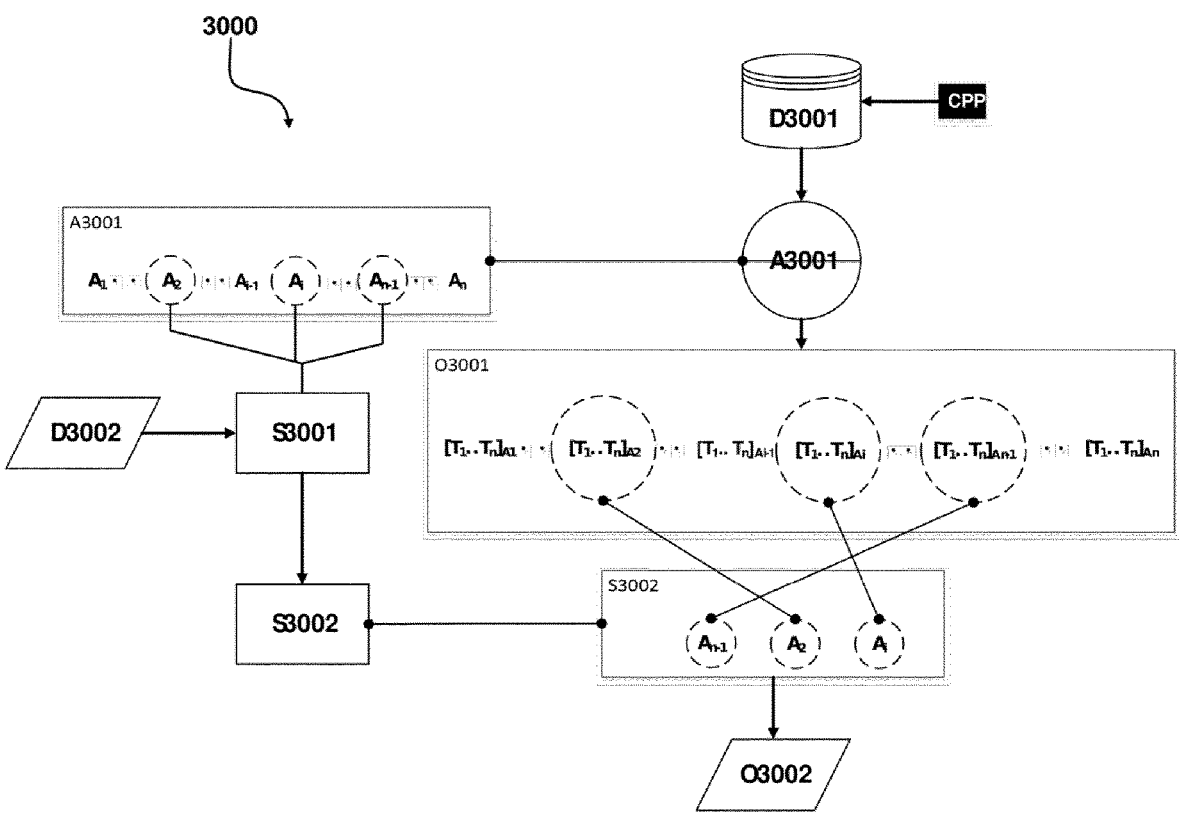
FIG. 3 is a logical data flow diagram of the computer implemented method of the present invention.

FIG. 1 depicts a schematic representation of a common coated transparent substrate 1000 which comprises a transparent substrate 1001 with a layered coating 1002 on one of its main faces. The coating 1002 may be a mono-layered, i.e. comprising only one layer 1002(1) or a multi-layered coating, i.e. comprising several layers 1002(1)-1002(n).

In particular, the coating 1002 may be a mono- or multi-layered coating comprising at least one dielectric layer and one functional layer. For instance, for building or automotive glass application, the functional layer may be an infrared-reflective metallic layers, mainly made of metals such as silver, gold, niobium or copper, to reduce heat and/or radiation transfer through the transparent glass panes. There may be more than one functional, e.g. two, three or more functional layer, eventually combined with dielectric layers, mainly through sandwiching configurations. The dielectric layers may help to counterbalance or adjust colour shifts, reflection and/or transmission effects that are due to said metallic layers, and to provide the sought solar factor or heat emission rate, also called emissivity.

The coating 1002 may also comprise other layers, either metallic of dielectric, to improve thermal and/or structural stability over time, during use, or upon subsequent transformations such as heating, tempering and/or bending The substrate 1001 is a transparent substrate such as mineral glass substrate or organic substrate. In the context of the invention, a transparent glass means a glass through which at least part of electromagnetic radiation is transmitted in the visible spectrum so that the shape and possibly some details of an object which is observed through that said glass can be distinguished. The substrate may be a thin, rigid or flexible, substrate.

A transparent glass can be organic or mineral glass. Examples of mineral glass are sodalime glass, aluminosilicate glass or borosilicate glass. Examples of organic transparent glass are poly(methyl methacrylate) (PMMA) or polycarbonate (PC) polymers With reference to FIG. 2, a deposit process can be illustrated by a deposit system 2000 comprising juxtaposed cells through which a transparent substrate 2008 is successively conveyed. In most common deposit systems, the transparent substrates are conveyed in sequence, one after the other, so that there are several transparent substrates in same time in the deposit system. A sheet can be located in one cell or in several cells in same time depending to its size.

The deposit system comprises an input cell 2001 into which the transparent substrate enters, a first buffer cell 2002, a first transfer cell 2003, a deposit section 2004, a second transfer cell 2005, a second buffer cell 2006 and an output cell 2007 from which exits the coated substrate 2008. The deposit section 2004 comprises a succession of deposit cell 2004(1)-2004(m). Each deposit cell is featured with means for depositing coating, e.g. magnetic field assisted sputtering (also called magnetron sputtering) system, ion beam assisted deposition (IBAD) system, evaporation system, chemical vapour deposition (CVD) system, plasma-enhanced chemical vapour deposition (PECVD) system or low pressure chemical vapour deposition (LPCVD) system. Deposit cells 2004(1)-2004(m) may also comprise pumping systems to create the vacuum conditions that suit deposition.

As explained above, to manufacture coated transparent substrates, each cell has to be accurately configured, most of the time manually, by skilled operators in order to obtain the required specifications for the coated substrates. For instance, some cells have to connected or disconnected from the deposit system 2000, the pumping systems have to be tuned to reach the required vacuum level, the electric controllers and software have to be configured to control the components of the system, the gas flow have to be adjusted, the cathodes have to be powered and the conveyor speed has to be fixed to get the correct deposition rate for the materials of the layers. In this context, disruptions, delays and out-of-specifications products may occur. It is an objective of the present invention to solve these problems.

In a first aspect of the invention, with reference to FIG. 3, there is provided a computer implemented method 3000 for configuring a coating process 2000 to deposit a targeted mono- or multi-layered coating 1002 on a transparent substrate 1001, wherein said method 3000 provides as output O3002 a series of ordered tasks which are executed on the coating process 2000, and comprises the following steps:

(a) providing a dataset D3001 comprising at least data related to parameters CPP of the coating process 2000;

(b) providing a set A3001 of algorithms $A_i, \ldots, A_n$ which takes, as input, data from the dataset D3001 of step (a) and provides, as output O3001, series of at one or several tasks $[T_1, \ldots, T_n]_{A1}$-$[T_1, \ldots, T_n]$ An associated to each of said algorithms;

(c) selecting S3001 at least two algorithms from the set A3001 of algorithms $A_i, \ldots, A_n$ depending on current states D3002 of the coating process 2000 as provided as input data;

(d) selecting S3002 the order in which the algorithms selected at step (c) has to be carried out so that the tasks O3002 provided by said algorithms are organized as a series of ordered tasks which are executed contextually onto the coating process at the corresponding stages 2001-2007 in said coating process 2000.

A core feature of the method according to the invention is the combination between a dataset comprising at least data related to parameters CPP of the coating process 2000, and a set A3001 of algorithms $A_i, \ldots, A_n$, the algorithms of which can be selected so that a series of ordered tasks which are executed on the coating process 2000 can be computed. One technical effect, which extends beyond a simple aggregation or juxtaposition of features, is that the ordered tasks may be contextualised in time according to the different stages of the coating process.

At step (d), the selected algorithms are carried out in an ordered sequence. It may be understood that several algorithms may be selected at a same rank in the order to carry them out in parallel. For instance, two algorithms can be carried out at the first rank, one at the second rank, three at the third rank, . . . .

Figure 4:
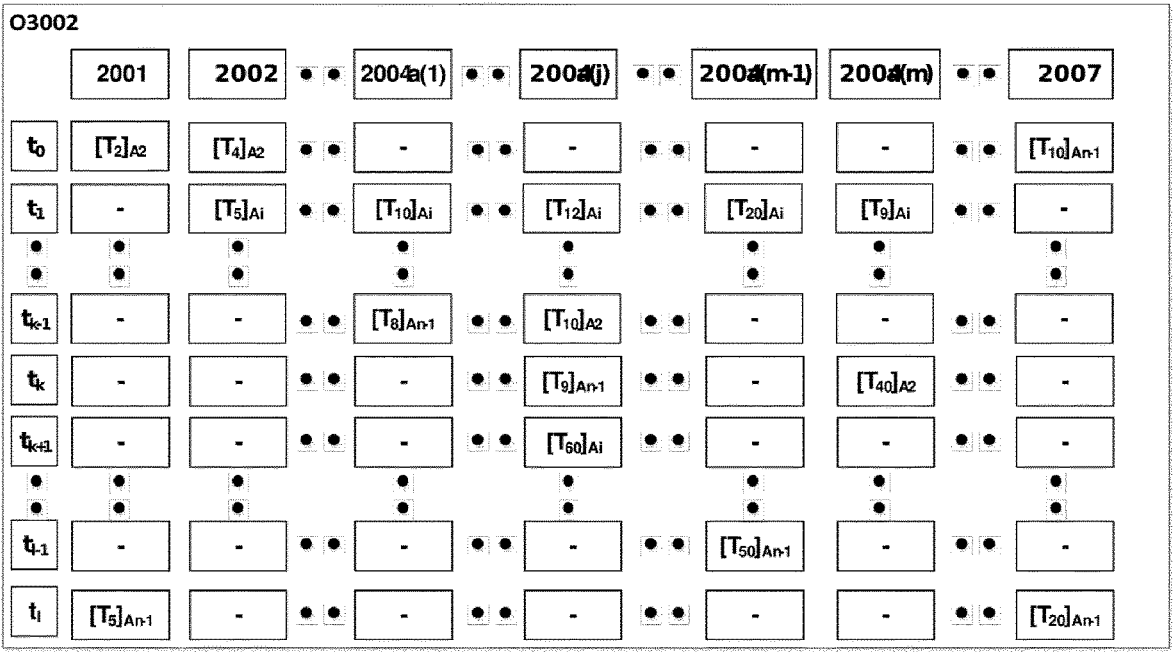
FIG. 4 is a schematic example of a time ordered series of tasks provided as output by the method according to the invention.

In an embodiment of the method according to the invention, the series of ordered tasks may be a time ordered series of automated and/or manually guided tasks. As an illustrative example, FIG. 4 shows a time ordered series of automated and/or manually guided tasks O3002 provided as output by the method according to the invention. On the figure, the series is represented as a matrix of chained and/or paralleled tasks that have to be carried out automatically and/or manually at a given time, $t_0 \ldots t_1$, and at given stages 2001-2007 of the coating process 2000.

Comparing to prior art, it may be an advantage of the invention to provide the tasks as structured data highlighting the relationships between said tasks and the internal functioning of different components of the deposit system implementing the coating process. The tasks may be time contextualised according to the different stages of the process in a rationalised series in order to improve the economic efficiency of the workflows, i.e. disruptions, delays and out-of-specifications products and human intervention for tasks in which such human intervention may not be required so that human operators can focus on delicate tasks that may require more attention.

Further, the invention may act as a reminder to prevent risks of forgetting to perform certain tasks that may be overlooked, whether because of intense workload for operators or their implication in urgent/important non-deferrable tasks, for example during emergency intervention to correct drifts in product specifications. Moreover, tasks which are traditionally performed may be fully automatized in a most technical and economic efficient way.

In a sense, the invention may advantageously allow optimized, rationalized interactions between the coating process and the operator regarding its internal functioning and its steering. Parameters may be adjusted more rapidly and more accurately thanks to the execution of manually and/or automatically tasks at appropriate time in an optimized sequence.

Another advantage of method according to the invention is its flexibility. The method may be reloaded and/or updated during operations on a given coating process in order to take changes in parameters of the coating process, features of the coating layers, quality functions of the coated substrates, and/or in the algorithms. More concretely, the dataset D3001 of step (a) and/or the algorithms of the set A3001 of step (b) may be modified according to new conditions for the coating process and/or changes in the deposit system implementing the coating process, the method may be reloaded, i.e. rerun, to update the time ordered series of automated and/or manually guided tasks in function to these conditions and/or changes.

In step (a) of the method according to the invention, a dataset is provided that comprises data related to parameters CPP of the coating process, data related to features of the layers of coating to be deposited, and data related to at least one quality function of coated transparent substrates.

Examples of coating process parameters CPP, may be partial pressures of gases, e.g. levels of water, oxygen, nitrogen or inert gases, cathode power set point or actual value, cathode voltage set point or actual value, magnetic fields, gas flows, gas partial pressures, gas total pressure, pumping capacity of the pumping systems, mechanical shields arrangement, geometric arrangement of magnetic devices, plasma emission and/or conveying speed of the substrates.

The coating process parameters may further relate to the transparent substrate onto which the coating is deposited. For example, the parameters CPP may comprise the spatial location and/or the speed of the conveyed substrates in the coating process 2000.

The data related to the coating process parameters may come from a data lake or a data warehouse containing more or less structured batches of data or streaming data. The data lake or data warehouse may contain a data history of coating process parameters regarding production of various coated transparent substrates in various production conditions. Alternatively, or complementarily, the data may also come from a real-time monitoring of the coating process by an instrumentation of deposit system with various sensors and/or controlling devices In advantageous embodiments, the dataset D3001 of step (a) may further comprise data related to features FC of the layers of coating 1002 to be deposited, and data related to at least one quality function QF of coated transparent substrates 1000. For some applications, some algorithms of the set A3001 of algorithms may require additional information regarding the coating to be deposited to provide automated and/or manually guided tasks. For instance, this may occur with algorithms to optimize sheet electrical resistance, optical properties or colours.

In the context of the invention, 'quality function' should not be interpreted as mathematical function but as related to particular technical feature or physicochemical property of the coated transparent substrate. In particular, it may relate to any intrinsic characteristic of the coated transparent substrate which may be observed, measured, or simulated without altering its identity.

Examples of quality function QF may relate to optics, mechanics, energetics, chemistry or application compatibility criteria, e.g. Head Up Display compatibility, of the coated transparent substrate. For examples, they may be optical properties, e.g. solar gain, light transmission coefficient, light reflection coefficient, or colour, of the coated substrate, and the homogeneity thereof as well. It may be a transmission and/or reflection electromagnetic spectrum. The electromagnetic spectra may be transmission and/or reflection spectra, acquired cither on the coated side or on the non-coated side of the substrate. In particular, the electromagnetic spectra may be advantageously transmission and/or reflection spectra with an observation angle equal to or less than 10° or with an observation angle more than 45° in the 295 nm-2000 nm, preferentially in 330 nm-1100 nm wavelength range.

Examples of features FC of the layers may be an optical, electrical, mechanical or electrical property. In particular, they may be thickness, chemical composition, electrical resistivity and/or complex refractive index of the layers in the coating, mechanical and/or chemical resistance of the layer(s) in the coating.

In an embodiment of the invention, the dataset D3001 of step (a) may further comprise data related to physicochemical, optical and/or mechanical properties of the transparent substrates. In some applications, the properties of the transparent substrates may have an impact on one or more quality functions of the coated substrates, and have to considered to prevent out-specifications products. Example of properties may be thickness, chemical composition, electrical resistivity and/or complex refractive index of the transparent substrates, and mechanical and/or chemical resistance of the transparent substrates In step (b) of the method according to the invention, a set of algorithms is provided, said algorithms take, as input, data from the dataset of step (a) and provides, as output O3002, a series of ordered tasks which are executed on the coating process (2000).

In the context of the invention, an algorithm is to be understood as a set of rules, actions, or operations that must be followed when solving a particular problem. An algorithm can be a computer algorithm, i.e. a set of rules actions, or operations which are carried out by a computer according to encoded computer readable instructions, or non-computer algorithm, i.e. a set of rules actions, or operations which are carried out by a human operator or an automate, or a combination thereof.

A first example of algorithm is computer and/or non-computer method for configuring the working point of one or several cathodes in the cells of magnetron sputtering based coating process. For instance, said first algorithm may then comprise the following steps:

(a) setting a first level of gas, e.g. oxygen, in a cell;

(b) powering the cathode of the said cell at a given power level;

(c) monitoring the voltage at the cathode while decreasing the gas level, until a sharp rise in the voltage is detected;

(d) decreasing the power level at the cathode;

(c) increasing the gas level significantly;

(f) decreasing the gas level at a level corresponding to the oxygen level at which the voltage increase was detected at step (c) and adding a safety margin;

(g) increasing the power of the cathode at the given power level of step (b);

A second example of algorithm may be a computer algorithm which emits notifications to remind an operator to connect/disconnect some components of the deposit system of the coating process, e.g. cathodes, pumps . . . , and/or checks that these components are connected/disconnected according to output of controller devices and send out notifications of shortcomings in this regard.

During first configurations of a coating process, low quality glass, also called draft glass, may be used in order to avoid wasting high quality glass for out-specifications coatings, and then reduce costs. A third example of algorithm may then be a computer algorithm which optimizes the low quality/high quality glasses rate during the adjustment stages by computing the required amount of low quality glasses for the adjustment according to the adjustment time and compute the right time to use high quality glass in function of.

A fourth example of algorithm may be a computer and/or non-computer algorithm to optimize the sheet electrical resistance of some or all layers according the coating according to given cathodes, e.g. titanium cathodes, in magnetron sputtering coating process by screening different powers and/or voltages and/or gases for cathodes.

A fifth example of algorithm may be a computer and/or non-computer algorithm to optimize the sheet mechanical resistance of some or all layers according the coating according to given cathodes, e.g. nickel chrome cathodes in magnetron sputtering coating process by screening different cathodes powers and/or voltages.

A sixth example of algorithm may be a computer and/or non-computer algorithm to optimize the colours of some or all layers according the coating according to given cathodes, e.g. silicon nitride cathodes, in magnetron sputtering coating process by screening different cathodes powers and/or voltages.

For planning maintenance or during maintenance of magnetron sputtering based coating process, there is often a need to evaluate the pumping capacity of pumping systems between neighbouring deposit cells. A seventh example of algorithm may be a computer and/or non-computer algorithm to evaluate this pumping capacity, said algorithm comprising the following steps:

(a) setting a given gas level in a first cell;

(b) measuring the pressure in the juxtaposed cells to said first cell while pumping in said cells;

(c) setting a new gas level for the first cell;

(d) measuring the pressure in the juxtaposed cells while pumping in said cells;

(c) computing the pumping capacity of the juxtaposed cells with mathematical/physical model;

(f) reiterate steps (a) to (e) for each cell to be investigated.

Also, during maintenance of magnetron sputtering based coating process, there may be often a need to detect gas leakage in the deposit system of the coating process. In this cope, an eighth example of algorithm may be an algorithm comprising the following steps:

(a) retrieving data from pressure and/or water partial pressure sensors located in deposit cells, (b) computing the time evolution of pressure and/or water partial pressure in each cell during pumping down operations, (c) determining if the computed time evolution follows a given decreasing rate and generating alerts in case of shortcoming in this respect.

A ninth example of algorithm may be a computer or non-computer algorithm which adjusts the level of reactive gas in deposit cells of a deposit system of magnetron sputtering bases coating process depending on the level of optical absorption of the coating, said optical absorption being measured by in-process or non in-process measuring instrument.

In an embodiment of the method according to the invention, the set of algorithms may comprise algorithms to optimize optical, mechanical, electrical and/or chemical properties of the layers of the coating by screening different values of parameters of the coating process. Examples of such algorithms are described in the patent applications EP 20315258.2 and EP 20315261.6.

The method according to the invention may advantageously be used as a preliminary stage before to launch feedback algorithms which real-time control and/or adjust the parameters of a deposit system or deposit cells in function of shifts in values of selected optical and/or physicochemical properties of the deposited coating, such as, for instance, those described in WO 2019110948 A1, WO 2018215274 A1, DE 102018101173 A1 or WO 2019/110948 A1.

Thanks to the method according to the invention, the coating process is already configured for the manufacturing of a given coated transparent substrate, so that the time required for the feedback algorithms to be stable and/or in a stationary regime is considerably reduced. For instance, the data related to the current state of the coating process after the configuration with the method according the invention, may be provided as input to the feedback algorithms. These feedback algorithms may then advantageously start from a pre-optimized state of the coating process, the initialisation and adjustment step for them to work efficiently may not be required anymore.

In this scope, in an embodiment of the method according to the invention, the set A3001 of algorithms further may comprise a feedback algorithm for automatically adjusting parameters of coating process to deposit a targeted mono- or multi-layered coating on a transparent substrate.

Figure 5:
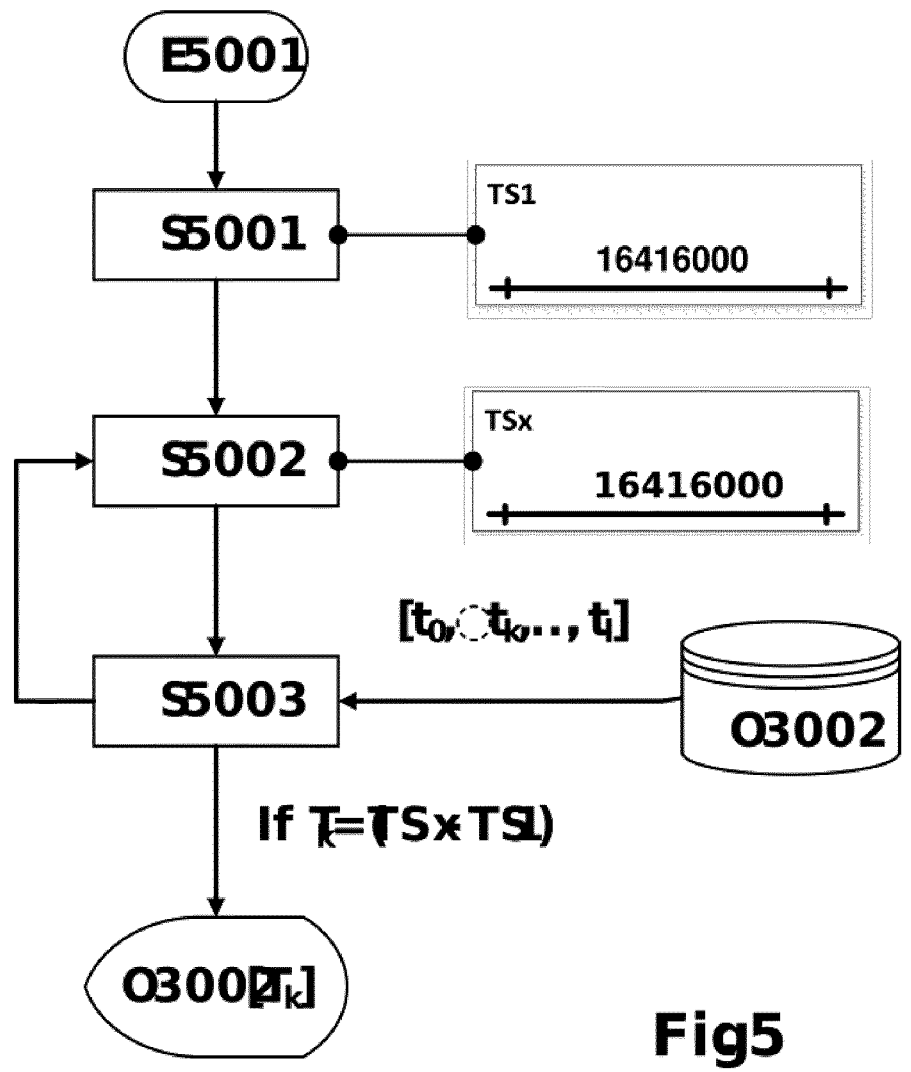
FIG. 5 is a logical data flow diagram of a method according to an example of embodiment of the method of the invention.

In an embodiment of the method according to the invention, the series of ordered tasks comprises task notified to an operator as scheduled tasks to be executed on the coating process. FIG. 5 is an example of a logical data flow diagram to computer implement such embodiment.

With reference to FIG. 5, a triggering event E5001 is first generated, for instance at the end of the step (d) of the method and/or an input from an operator or from an electronic device of the deposit system when the operator and/or the coating process are ready to perform a time ordered series 4000 of automated and/or manually guided tasks previously computed. The triggering event E5001 starts a first step of computing S5001 a reference time TSI, for example as a timestamp before a loop is initiated. The loop comprises a first step of computing S5002 the elapsed time since the triggering event E5001 by subtracting the first timestamp TSI from a subsequent time event, e.g. a subsequent timestamp TSx, computed at each iteration of the loop, and a second step of comparing S5003 the calculated elapsed time with the time entries $[t_0, \ldots t_k, \ldots, t_l]$ of the time ordered series of automated and/or manually guided tasks provided as output at step (d). If the elapsed time corresponds to a time entry $T_k$ of the time ordered series of automated and/or manually guided tasks, the tasks O3002 $[T_k]$ corresponding to that entry are returned as a notified output to the operator.

The series of ordered tasks provided as output O3002 by the method according to the invention may be automated and/or manually guided tasks. As explained above, the invention may act as a reminder to prevent risks of forgetting to perform certain tasks that may be overlooked, whether because of intense workload for operators or their implication in urgent/important non-deferrable tasks. Accordingly, the method of the invention is adapted to manage tasks to be performed by an operator.

Thus, in an embodiment of the method according to the invention, the series of ordered tasks may comprise tasks to be carried out by an operator. The series of ordered tasks comprise plugging pneumatic, hydraulic, electric and/or mechanic components of the coating process (2000).

Alternatively, or additionally, the series of ordered tasks may comprise maintenance tasks. Maintenance operations may often be critical in a coating process. They may have to be carried out carefully and regularly for an optimal long-term operation of the process. The method according to the invention may advantageously help to make sure that these operations are fully carried out at right time, and none of them is missed at the different stages of the coating process.

The method according to the invention is well adapted for coating process to deposit a targeted mono- or multi-layered thin films coating on a transparent substrate. In a particular embodiment of the method according to the invention, the coating process may further comprise at least one sputtering cell comprising at least one cathode, and the set of algorithms may further contain an algorithm providing as output automated steps to set the voltage/gas pressure working point of said sputtering cell.

Figure 6:
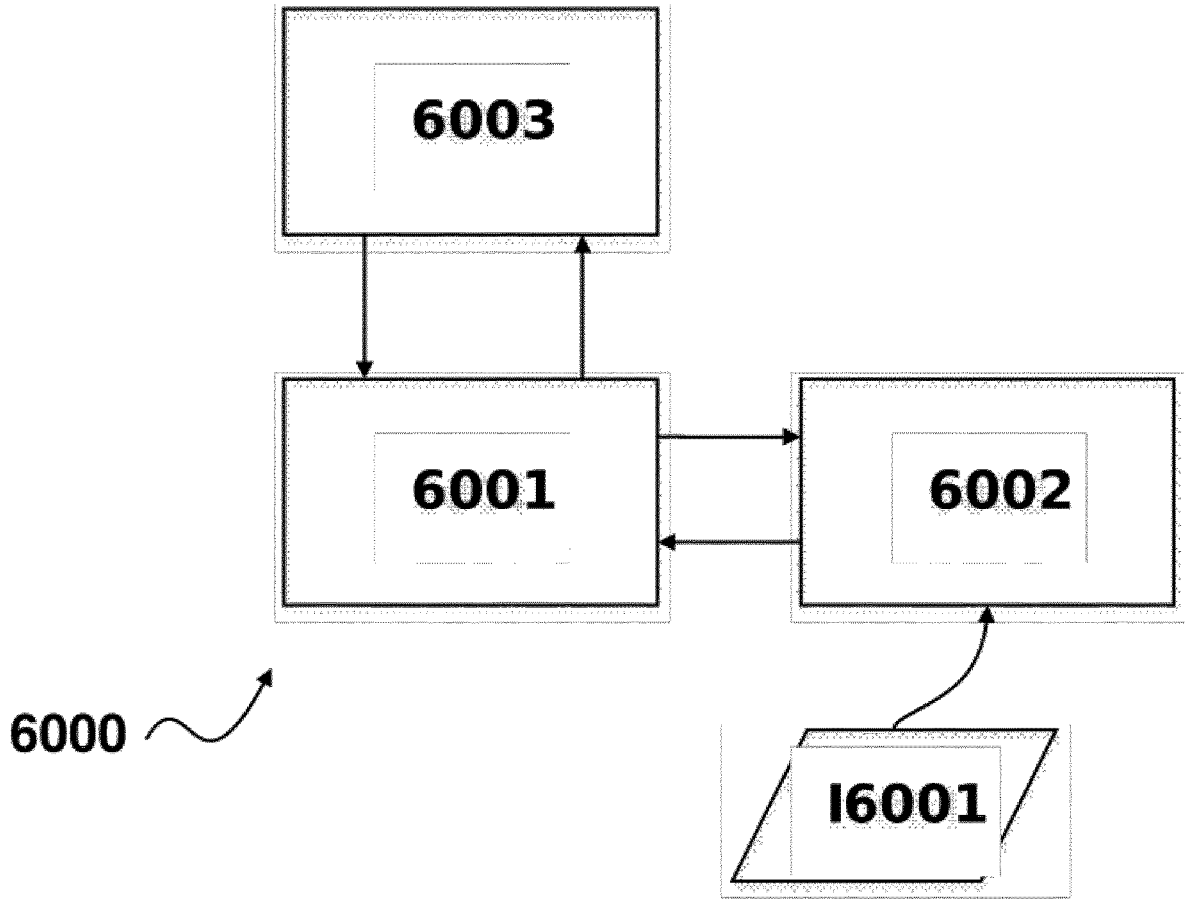
FIG. 6 is a schematic representation of a data processing system according to an aspect of the invention.

The method of the invention is computer implemented. With reference to FIG. 6, according to the second aspect of the invention, there is provided a data processing system 6000 comprising means for carrying out the method according to any of the embodiments described herewith. Example of means for carrying out the method is a device 6001 which can be instructed to carry out sequences of arithmetic or logical operations automatically to perform tasks or actions. Such device, also called computer, can comprise one or more Central Processing Unit (CPU) and at least a controller device that are adapted to perform those operations. It can further comprise other electronic components like input/output interfaces 6003, non-volatile or volatile storages devices 6003, and buses that are communication systems for the data transfer between components inside a computer, or between computers. One of the input/output devices can be user interface for human-machine interaction, for example graphical user interface to display human understandable information.

In another aspect of the invention, there is provided a computer program 16001 comprising instructions which, when the program is executed by a computer, cause the computer to carry out the method of the invention according to any embodiments described herein.

Any kind of programming language, either compiled or interpreted, can be used to implement the steps of the method of the invention. The computer program can be part of a software solution, i.e. part of a collection of executable instructions, code, scripts or the like and/or databases.

Another object of the invention is to provide a computer-readable medium 6002 comprising instructions which, when executed by a computer, cause the computer to carry out the method according to any of the embodiments described herein.

The computer-readable storage 6002 is preferably a non-volatile storage or memory, for example hard disk drive or solid-state drive. The computer-readable storage can be removable storage media or a non-removable storage media as part of a computer.

Alternatively, the computer-readable storage may be a volatile memory inside a removable media. This can case the deployment of the invention into many production sites.

The computer-readable storage 6002 can be part of a computer used as a server from which executable instructions can be downloaded and, when they are executed by a computer, cause the computer to carry out a method according to any of the embodiments described herein.

Figure 7:
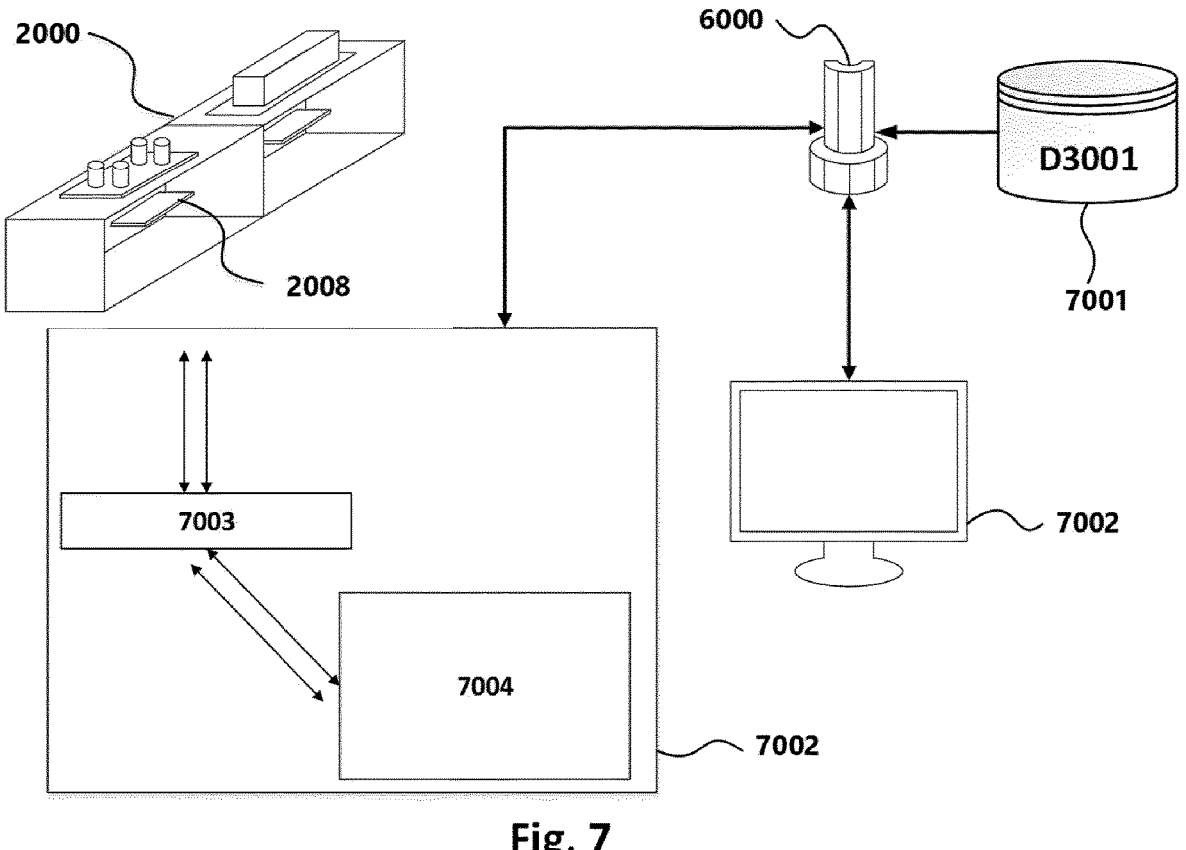
FIG. 7 is an illustrative example of a data processing system according to the invention which is interfaced with a coating process via a device controller.

Alternatively, the program may be implemented in a distributed computing environment, e.g. cloud computing. The instructions can be executed on the server to which client computers can connect and provide encoded data as inputs to the method of the invention. Once data are processed, the output can be downloaded and decoded onto the client computer or directly send, for example, as instructions. This kind of implementation can be advantageous as it can be realised in a distributed computing environment such as a cloud computing solution FIG. 7 is an illustrative example of a data processing system 6000 according to the invention which is interfaced with a coating process 2000 via a device controller 7002, e.g. programmable logic controller, that handles the I/O communications between the hardware/software components of the coating process 2000 and the data processing system 6000.

The data processing system 6000 comprises decoding means (not shown) to retrieve data to or from a computer readable storage into which is encoded a database 7001 or comprises an I/O software component to retrieve data from a data warehouse 7001. The database or the data warehouse 7001 data contain data related to parameters of the coating process, data related to features of the layers of coating to be deposited, and data related to at least one quality function of coated transparent substrates so that a dataset D3001 according to the method of the invention can be retrieved.

The device controller 7002 may comprise an I/O unit 7003 to encode/decode data from or to the hardware/software components of the coating process 2000 and a data processing core 7003 to process data that are exchanged between the data processing means 6000 and coating process 2000.

The coating process may be instrumented with various high throughputs sensors and measuring devices, e.g. high data acquisition chips, I/O electronic devices, programmable logic controllers, pressure sensors, temperature sensors, vacuum sensors, gas sensors, speed rate sensors, spectrometers, ellipsometers, sheet resistivity probe systems, optical interferometers or similar devices. These sensors and measuring devices may help to acquire data related to parameters of the coating process, data related to features of the layers of coating to be deposited, and data related to at least one quality function of coated transparent substrates.

The coating process may also be instrumented with various electrical, mechanical, and/or pneumatic controlling devices for the automatic and/or manual commutation and/or working of switches, motor controllers and drives, robots, pendants, monitors, data acquisition systems, data loggers and any other devices required for the functioning of the coating system 2000.

The I/O unit 7003 may be configured to encode/decode data from and to these various instruments.

The data processing system 6000 may comprise or plugged to I/O means 7002 for displaying information and interacting with an operator, for instance a display monitor with a keyboard, or a touch screen. The I/O means may allow to select the at least two algorithms of step (c) and select the order in which they may be executed at step (d) and/or to display the time ordered series of automated and/or manually guided tasks to the operators according to the embodiments described herewith. In particular, the IO means can act as a notification means to notify the tasks, possibly scheduled tasks, to the operator. A sound and/or voice emitting device may also be used as complementary notification means.

As explained before, the method according to the invention may help to improve the interaction between the coating process and the operator regarding the internal functioning of said coating process in order to rapidly and accurately adjust the parameters of said coating process for depositing a coating on transparent substrates.

In this scope, the I/O means may advantageously comprise an interactive graphical use interface to improve the operator experience when interacting with the coating process by using the method according to the invention.

Figure 8:
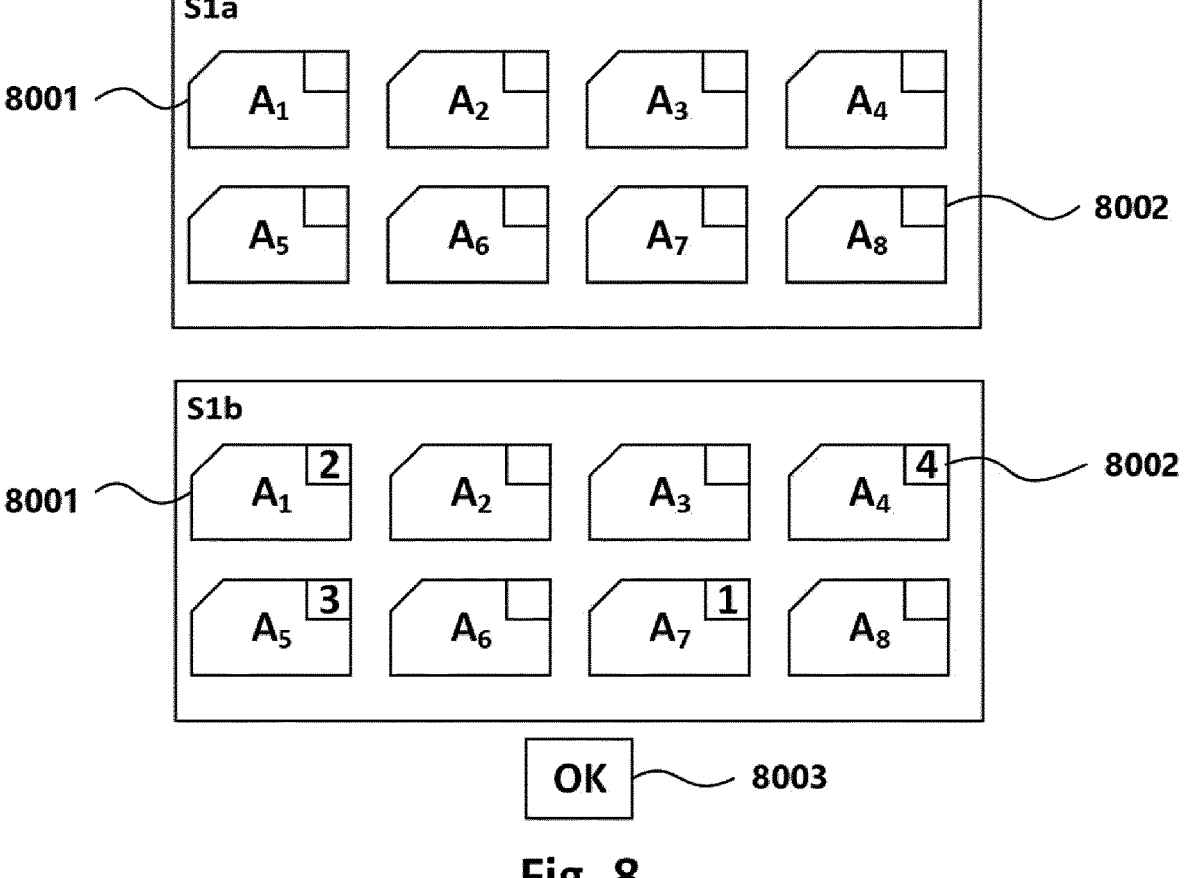
FIG. 8 is illustrative example of an input display screen for a method of entering and displaying of data in a data processing system according to the invention.
Figure 9:
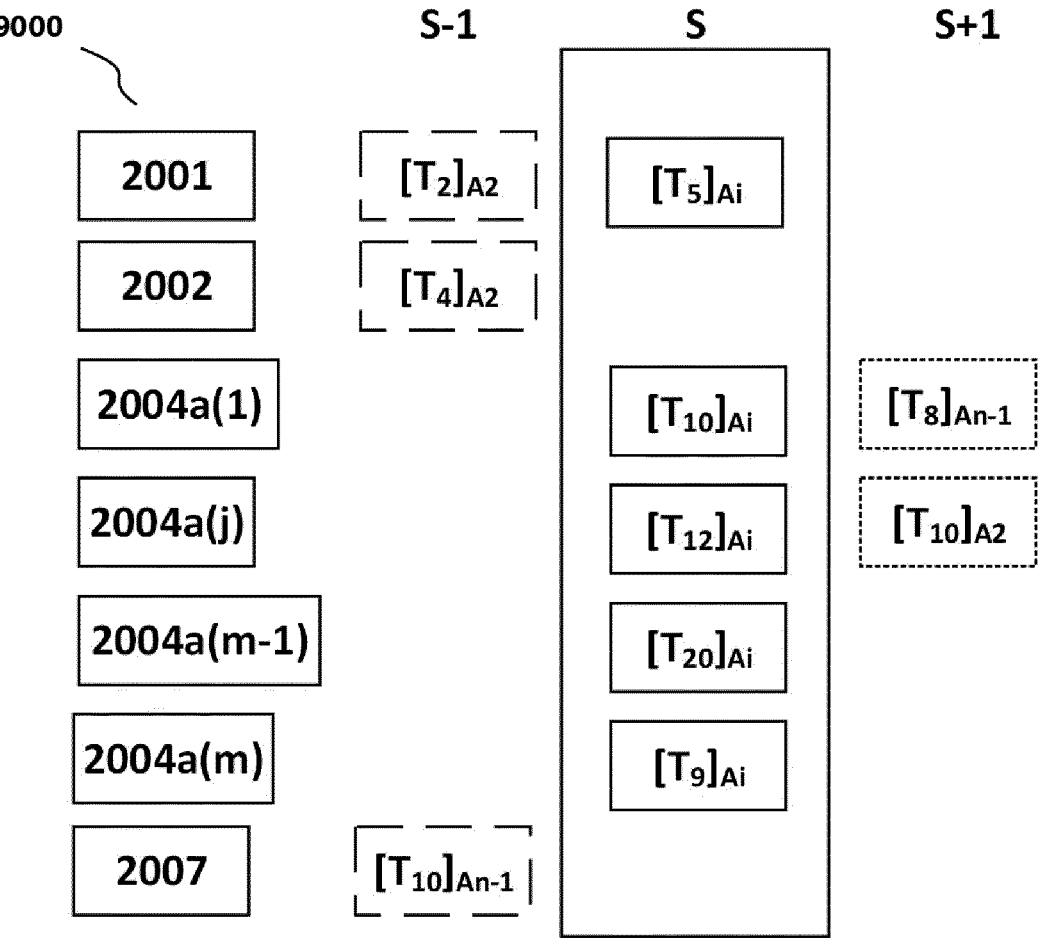
FIG. 9 is an illustrative example of an output display screen for a method of entering and displaying of data in a data processing system according to the invention

According to a third aspect of the invention, with reference to FIGS. 8 and 9, there is provided method of entering and displaying of data in a data processing system comprising means for carrying out a computer implemented method for configuring coating process according to any embodiments previously described, wherein said method of entering and displaying of data comprising the following steps:

(a) displaying Sla a linear sequence of icons 8001, each icons representing an algorithm from a set a set A3001 of algorithms $A_i, \ldots, A_n$;

(b) displaying input fields 8002 associated with each icon 8001 and being configured to accept a integer number corresponding to the order in which the algorithms associated with the corresponding icon may be executed;

(c) entering Silb a number in the input fields;

(c) displaying an input field 8003 being configured to make the data processing system execute the computer implemented method according to the order of the number entered in the inputs fields 8002, (d) displaying the computed series of ordered as a linear sequence S−1, S, S+1 of contextualized tasks according to the stages 9000 of the coating process.

The above method for entering and displaying data in a data processing system according to the invention allows to provide a better user experience in the implementation of the computer implemented method to for configuring a coating process to deposit a targeted mono- or multi-layered coating on a transparent substrate. It allows the operator to focus on relevant tasks at right time and to provide a better control of the coating process by enabling the supervision and the checking of the execution of automated and/or manually guided tasks in due course for minimal disruption of the coating process.

Further, the method allows to represent tasks as clear, organised and human understandable directives for any operator regardless his level of skills and deep knowledge of the coating process. In a sense, it makes the control of the coating process easier even for those operators which does not still have a deep understanding of the process, and allows the rapid deployment and commissioning of coating process as new installation in a plant.

In advantageous embodiments, the tasks displayed at step (d) may successively displayed in a dynamic way according to time or execution criterions. For instance, a task may be displayed once the previous task in the series is performed and/or, when the ordered series of automated and/or manually guided tasks is time ordered, a task may be displayed when the time associated with said task corresponds to the current time.

FIG. 9 provides an example of a display screen for the step (d), in which past S−1, current S and future S+1 tasks are displayed contextualised according to the stages 9000 of the coating process. In the S−1 series, all tasks are performed, which is materialized by the dashed boxes. The S series contains tasks that have to executed either manually or automatically or both and are emphasized by solid lined box around the tasks (any other graphical emphasis means can be used). The S+1 series contains future tasks to perform, which is materialized by dotted boxes; The series S+1 is displayed as a preview of what may come next S for the operator.

Alternatively, or additionally, the display of a series S−1, S or S+1 may be time scheduled according to the time associated with each tasks when the ordered series of automated and/or manually guided tasks is time ordered. A timer may be displayed on the screen to indicate the remaining time to perform a series of tasks and/or each individual tasks of a series. The accomplishment of the tasks may be checked either manually by the operator or automatically, through the use of controller devices, or both.

It is to be understood that the embodiments described herein are the most preferred embodiments to describe the invention. These embodiments may be combined unless their respective functions appear incompatible for such combination.

It is to be further understood that the invention is not limited to the disclosed embodiments. It is intended to cover equivalent arrangements included within the scope of the claims.

The invention claimed is:

1. A computer implemented method for configuring a coating process to deposit a targeted mono- or multi-layered coating on a transparent substrate, wherein said method provides as output a series of ordered tasks which are executed on the coating process, and comprises the following steps:

(a) providing a dataset comprising at least data related to parameters of the coating process;

(b) providing a set of algorithms which takes, as input, data from the dataset of step (a) and provides, as output, series of at one or several tasks associated to each of said algorithms;

(c) selecting at least two algorithms from the set of algorithms depending on current states of the coating process as provided as input data, and (d) selecting an order in which the algorithms selected at step (c) has to be carried out so that the tasks provided by said algorithms are organized as a series of ordered tasks which are executed contextually onto the coating process at corresponding stages in said coating process.

2. The method according to claim 1, wherein the series of ordered tasks is a time ordered series of automated and/or manually guided tasks.

3. The method according to claim 2, wherein the series of ordered tasks comprises task notified to an operator as scheduled tasks to be executed on the coating process.

4. The method according to claim 1, wherein the series of ordered tasks comprises plugging pneumatic, hydraulic, electric and/or mechanic components of the coating process.

5. The method according to claim 1, wherein the series of ordered tasks comprises maintenance tasks.

6. The method according to claim 1, wherein the parameters of the coating process comprise spatial localization and/or speed of conveyed substrates in the coating process.

7. The method according to claim 1, wherein the dataset of step (a) further comprises data related to features of layers of coating to be deposited, and data related to at least one quality function of coated transparent substrates.

8. The method according to claim 1, wherein the dataset of step (a) further comprises data related to physicochemical, optical and/or mechanical properties of the transparent substrates.

9. The method according to claim 1, wherein the set of algorithms comprises algorithms to optimize optical, mechanical, electrical and/or chemical properties of layers of the coating by screening different values of parameters of the coating process.

10. The method according to claim 1, wherein the set of algorithms further comprises a feedback algorithm for automatically adjusting parameters of coating process to deposit a targeted mono- or multi-layered coating on the transparent substrate.

11. The method according to claim 1, wherein said coating process further comprises at least one sputtering cell comprising at least one cathode, and wherein the set of algorithms further contains an algorithm providing as output automated steps to set the voltage/gas pressure working point of said sputtering cell.

12. The method according to claim 1, wherein the input data of the current states of the coating process include measurement data from one or more of a pressure sensor, a temperature sensor, a vacuum sensor, a gas sensor, a speed rate sensor, a spectrometer, an ellipsometer, a sheet resistivity probe system, and an optical interferometer.

13. A data processing system comprising means for carrying out a method according to claim 1.

14. A non-transitory computer readable medium comprising instructions which, when executed by a computer, cause the computer to carry out a method according to claim 1.

15. A method of entering and displaying of data in a data processing system comprising means for carrying out a computer implemented method for configuring a coating process to deposit a targeted mono- or multi-layered coating on a transparent substrate, wherein said computer implemented method provides as output a series of ordered tasks which are executed on the coating process, and comprises the following steps:

(i) providing a dataset comprising at least data related to parameters of the coating process;

(ii) providing a set of algorithms which takes, as input, data from the dataset of step (a) and provides, as output, series of at one or several tasks associated to each of said algorithms;

(iii) selecting at least two algorithms from the set of algorithms depending on current states of the coating process as provided as input data, and (iv) selecting an order in which the algorithms selected at step (iii) has to be carried out so that the tasks provided by said algorithms are organized as a series of ordered tasks which are executed contextually onto the coating process at corresponding stages in said coating process, wherein said method of entering and displaying of data comprising the following steps:

(a) displaying a linear sequence of icons, each icons representing an algorithm from a set a set of algorithms:

(b) displaying input fields associated with each icon and being configured to accept a integer number corresponding to the order in which the algorithms associated with the corresponding icon may be executed;

(c) entering a number in the input fields;

(c) displaying an input field being configured to make the data processing system execute the computer implemented method according to the order of the number entered in the inputs fields, and (d) displaying the computed series of ordered as a linear sequence of contextualized tasks according to the stages of the coating process.

16. The method according to claim 15, wherein the series of ordered tasks is a time ordered series and, in step (d), a task is displayed when the current time is the time associated with said task.

* * * * *